United States Patent Office 2,871,127
Patented Jan. 27, 1959

2,871,127

CHEESE COMPOSITION

William E. Barch, Bronx, and Walter Neumann, Larchmont, N. Y., assignors to Standard Brands Incorporated, New York, N. Y., a corporation of Delaware No Drawing. Application August 10, 1955
Serial No. 527,655

10 Claims. (Cl. 99—117)

This invention relates to a cheese spread and a method for preparing the same.

An object of the invention is to produce a pasteurized emulsion comprising hard cheese with or without added milk fat and other milk solids which conforms to government process cheese spread standards and is semi-liquid and readily spreadable at household refrigerator temperatures (about 45° F.).

A more specific object of the invention is to produce a pasteurized cheese of the Cheddar type conforming to government standards for process cheese spread and which is semi-liquid and readily spreadable at household refrigerator temperatures.

Heretofore it has been necessary to mix hard cheese with a large excess of water, or to replace the milk fat with a lower melting, non-milk fat to obtain a product readily spreadable at refrigerator temperatures with consequent departure from process cheese spread standards. There are many such products on the market. These should not be confused with the products of the present invention the preferred embodiment of which is a true process cheese spread.

A soft cheese such as Limburger or Camembert will remain spreadable at household refrigerator temperatures even though it has been pasteurized. However, when a hard cheese such as Cheddar cheese, as such or as process cheese, is heated to pasteurization temperature it melts and then sets to a hard rubbery unspreadable mass on cooling. We have found that this setting can be avoided and a hard cheese can be converted into a readily spreadable mass if it is thoroughly homogenized at a relatively low temperature before pasteurization. By hard cheese we mean a cheese which, at household refrigerator temperature, cannot be readily spread by hand with a knife on a soda cracker without breaking the cracker.

The invention will be better understood when described in connection with the following example which is given for illustrative purposes only.

A cheese product was prepared from the following ingredients:

| | Percent |
|---|---|
| Cheddar cheese | 50 |
| Butter | 13.4 |
| Dry cheese whey | 5.8 |
| Non-fat dried milk | 3.9 |
| Anhydrous secondary sodium phosphate | 1.6 |
| Hydrated primary sodium phosphate | 1.1 |
| Glyceryl monostearate | 0.5 |
| Worcestershire sauce | 0.4 |
| Mustard | 0.4 |
| Salt | 0.3 |
| Water | 22.6 |
| F. D. & C. Yellow 4 | .06 |
| | 100.06 |

To prepare this product one may proceed as follows:

(1) Add at room temperature to a Waring Blendor in order—water, salt, Worcestershire sauce, mustard, dry milk, whey and dye. Homogenize thoroughly two minutes.

(2) Add primary and then secondary phosphates. The mixture thickens. Homogenize thoroughly one minute.

(3) Add melted butter in which glyceryl monostearate has been dissolved. Homogenize thoroughly two minutes.

(4) Add grated cheese. Homogenize at 45–50° C. to a perfectly smooth thick emulsion for five minutes.

(5) Pasteurize by heating to 75–80° C. with hand stirring. Five minutes are required to reach this temperature.

(6) Homogenize at 75° C. for five minutes.

(7) Pour into jars and seal hot.

(8) Hold thirty minutes for slow cooling before refrigerating. The product obtained had a pH of 6.10 and analyzed as follows, as compared to American Cheddar cheese:

| | | American Cheddar Cheese [1] |
|---|---|---|
| Water | 43.6 | 43.9 max. |
| Milk fat | 28.1 | 30.0 min. |
| Milk protein | 14.6 | 20.8 min. |
| Lactose | 6.4 | 7.0 max. |

[1] "American Cheddar—Fundamentals of Dairy Science." A. C. S Monograph #41. Second edition, page 40 (1935).

The product was cooled to household refrigerator temperature (45° F.). At this temperature it could be readily spread with a knife on a soda cracker without breaking the cracker.

In steps 1 to 3 the order of addition of the ingredients and length of time of stirring are not critical provided a smooth emulsion is obtained at the end of step 3 with all soluble ingredients completely dissolved. If desired, the flavoring and coloring ingredients may be omitted.

The temperature of homogenization in step 4 is critical. The following table shows the viscosities of the finished cheese spread obtained at different homogenization temperatures in this step:

| Homogenization Temp., ° C. | Viscosity [1] |
|---|---|
| 20–25 | 435 |
| 35–40 | 55 |
| 40–45 | 46 |
| 50–55 | 22 |
| 60–65 | 435 |

[1] Brookfield Heliopathic Viscometer at 25° C., spindle #3.

At temperatures of about 25° C. and below, the mix is so heavy that thorough homogenization is difficult to attain. In the neighborhood of 60° C. some change takes place in the cheese protein, possibly a denaturation which, if it occurs before homogenization is complete, causes the molten cheese to set hard when cooled. If homogenization is complete before the critical temperature is reached, the change is prevented, possibly due to separation of the individual protein aggregates from each other in the fine emulsion. The emulsion can then be safely heated to pasteurization temperature (about 75° C.) and the cheese will not set hard on cooling.

Steps 5 and 6 may be combined if the operation is carried out in a jacketed tank. Both temperature and time should be the minimum consistent with complete pasteurization.

U. S. Government process cheese spread standards require at least 51% cheese, not less than 20% milk fat and more than 44% but not more than 60% moisture. See Federal Register, volume 20, page 9597. Canadian Government process cheese spread standards require a minimum of 28% milk fat and not more than 43% moisture. While there is no minimum cheese requirement in Canada, at least 35% cheese is advisable for flavor. There is no upper limit for the cheese but at about 85% the mixture becomes mechanically difficult to handle in the essential low temperature homogenization step 4. The phosphates in the formula are common cheese emulsifiers used in process cheese manufacture and may be replaced by any other cheese emulsifier, for instance, sodium citrate or Rochelle salt. The glyceryl monostearate gives a smoother product but is not essential. Homogenization may be performed in any type of homogenization equipment or colloid mill that has a strong shearing action and particularly in a Waring Blendor. A Manton-Gaulin homogenizer may be used but it does not give as good results because its shearing action is not as great. Mixing of the ordinary type, however thorough, for instance by worm or anchor stirrer arrangements of process cheese cookers, will not give the desired result.

The pH of the product should be about 6.0 to 6.2. At a lower pH the texture becomes chalky and grainy. Higher pH increases danger of bacterial spoilage. The pH may be adjusted to compensate for the variable acidity of different lots of cheese by varying the ratio of the primary and secondary sodium orthophosphates.

Since certain changes may be made in the above process and composition which embody the invention without departing from its spirit or scope it is intended that all matter contained in the above description shall be interpreted as illustrative and not in a limiting sense. It is also to be understood that the following claims are intended to cover all of the generic and specific features of the invention herein described.

We claim:

1. A method of preparing cheese a spread which comprises forming a mixture consisting essentially of milk solids, an emulsifying agent and water and containing at least 50% hard cheese, at least 20% milk fat and not more than 60% water, homogenizing the mixture at a temperature lower than about 60° C. and pasteurizing the homogenized mixture.

2. A method as claimed in claim 1 wherein the cheese is Cheddar cheese.

3. A method as claimed in claim 2 wherein the homogenization temperature is about 45–50° C.

4. A method of preparing a cheese spread which comprises forming a mixture of Cheddar cheese, milk fat, dry cheese whey, non-fat dried milk, an emulsifying agent and flavoring material, said mixture containing at least 50% Cheddar cheese, at least 20% milk fat and not more than 60% water, homogenizing the mixture at a temperature lower than about 60° C. and pasteurizing the homogenized mixture.

5. A method as claimed in claim 4 wherein the homogenization temperature is about 45–50° C.

6. A method of preparing a cheese spread which comprises forming a mixture of the following ingredients in the approximate proportions indicated:

| | |
|---|---|
| Cheddar cheese | 50 |
| Butter | 13 |
| Dry cheese whey | 6 |
| Non-fat dried milk | 4 |
| Emulsifying agent | Small amount |
| Water | 23 | homogenizing this mixture at a temperature of about 45–50° C. and pasteurizing the homogenized mixture.

7. A cheese spread consisting essentially of milk solids, an emulsifying agent and water, containing at least 50% hard cheese, at least 20% milk fat and not more than 60% water, said cheese spread being semi-liquid and readily spreadable at household refrigerator temperatures.

8. A cheese spread prepared by the method defined in claim 1.

9. A cheese spread consisting essentially of about 50% Cheddar cheese, about 13% butter, about 6% dry cheese whey, about 4% non-fat dried milk, about 23% water and a small amount of an emulsifying agent, said cheese spread being semi-liquid and readily spreadable at household refrigerator temperatures.

10. A cheese spread prepared by the method defined in claim 6.

References Cited in the file of this patent

UNITED STATES PATENTS

| | | |
|---|---|---|
| 1,335,383 | McColl et al. | Mar. 30, 1920 |
| 1,737,770 | Parsons | Dec. 3, 1929 |
| 2,009,136 | Grelck | July 23, 1935 |
| 2,688,553 | Schicks et al. | Sept. 7, 1954 |

OTHER REFERENCES

Herrington: Milk and Milk Processing, New York, 1948, pp. 292–293.

U. S. D. A. Handbook No. 54, Cheese Varieties, December 1953, pp. 95 to 97.